(12) United States Patent
Hirano et al.

(10) Patent No.: US 12,212,008 B2
(45) Date of Patent: Jan. 28, 2025

(54) BATTERY

(71) Applicant: Panasonic Intellectual Property Management Co., Ltd., Osaka (JP)

(72) Inventors: Tatsuya Hirano, Osaka (JP); Kazutoshi Kohira, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 756 days.

(21) Appl. No.: 17/414,782

(22) PCT Filed: Dec. 19, 2019

(86) PCT No.: PCT/JP2019/049753
§ 371 (c)(1),
(2) Date: Jun. 16, 2021

(87) PCT Pub. No.: WO2020/137777
PCT Pub. Date: Jul. 2, 2020

(65) Prior Publication Data
US 2022/0085442 A1    Mar. 17, 2022

(30) Foreign Application Priority Data
Dec. 28, 2018    (JP) ................ 2018-248608

(51) Int. Cl.
*H01M 50/179*    (2021.01)
*H01M 50/107*    (2021.01)
(Continued)

(52) U.S. Cl.
CPC ....... *H01M 50/179* (2021.01); *H01M 50/107* (2021.01); *H01M 50/184* (2021.01); *H01M 50/188* (2021.01)

(58) Field of Classification Search
CPC ............ H01M 50/179; H01M 50/107; H01M 50/184; H01M 50/188
See application file for complete search history.

(56) References Cited

U.S. PATENT DOCUMENTS

2020/0365839 A1\*  11/2020  Kim .................. H01M 10/0422

FOREIGN PATENT DOCUMENTS

| CN | 103151475 A | 6/2013 |
| JP | 7-105933 | 4/1995 |

(Continued)

OTHER PUBLICATIONS

Toizono et al., JP 212-234716, Espacenet machine translation, 2012 (Year: 2012).\*

(Continued)

*Primary Examiner* — Adam A Arciero
(74) *Attorney, Agent, or Firm* — WHDA, LLP (57) ABSTRACT

A battery includes a battery can which includes a cylindrical portion having an opening edge portion at one end portion and a bottom portion closing the other end portion of the cylindrical portion, an electrode assembly which is housed in the cylindrical portion, and an opening sealing body which seals an opening formed in the opening edge portion. The opening sealing body includes a terminal portion and a gasket interposed in a compressed state between the terminal portion and the opening edge portion. The opening edge portion includes at least a base portion extending in an axial direction of the cylindrical portion and a tongue portion protruding from the base portion, and the tongue portion extends inward in a radial direction of the cylindrical portion so as to cover an upper surface of the gasket.

10 Claims, 6 Drawing Sheets

(A)

(B)

(51) Int. Cl.
  *H01M 50/184*  (2021.01)
  *H01M 50/188*  (2021.01)

(56) References Cited

FOREIGN PATENT DOCUMENTS

| JP | 2009-283192 A | 12/2009 | | |
|----|---------------|---------|---|---|
| JP | 2012-234716 A | 11/2012 | | |
| WO | WO-2019117345 A1 * | 6/2019 | ........... | C25D 11/022 |

OTHER PUBLICATIONS

English Translation of Chinese Search Report dated Dec. 2, 2022, issued in counterpart CN application No. 201980083577.4. (3 pages).

International Search Report of PCT application No. PCT/JP2019/049753 dated Mar. 17, 2020.

* cited by examiner

BATTERY

CROSS-REFERENCE TO RELATED APPLICATIONS

This application is a U.S. national stage application of the PCT International Application No. PCT/JP2019/049753 filed on Dec. 19, 2019, which claims the benefit of foreign priority of Japanese patent application No. 2018-248608 filed on Dec. 28, 2018, the contents all of which are incorporated herein by reference.

The present invention relates to a battery.

BACKGROUND ART

As a method for sealing an opening of a battery can after housing an electrode assembly in the battery can, as described in Patent Literature 1, a following method is known. An annular groove is formed by reducing a diameter of the battery case (battery can) in the vicinity of the opening of the battery case inward. A gasket and an opening sealing plate are mounted on an upper stepped portion of a groove portion, and an opening end portion of the battery case is crimped to the opening sealing plate by way of the gasket to form a crimped portion.

CITATION LIST

Patent Literature

PTL 1: Unexamined Japanese Patent Publication No. 7-105933A

SUMMARY OF THE INVENTION

Technical Problem

Usually, the battery can function as one external terminal, and the opening sealing plate functions as the other external terminal. When external lead wires are connected to the respective external terminals, one external lead wire is led out from a lower surface of the battery, and the other external lead wire is led out from an upper surface of the battery. Therefore, a space for wiring is required in the vertical direction of the battery.

In the battery having the groove portion and the crimped portion as described in PTL1, the opening sealing member is mounted on the groove portion, and the crimped portion is formed on the opening sealing member by way of the gasket. In this case, the opening edge of the battery can is crimped in an inverted L shape while covering the gasket, and extends in a ring shape along a surface substantially parallel to the opening sealing plate. It is also conceivable to connect the battery can and the external lead wire on the upper surface of the ring-shaped extending portion. However, since an inner circumferential length of the extending portion is shorter than an outer circumferential length. Accordingly, the inner circumferential side of the extending portion tends to have an irregular ring shape where the extending portion waves in the axial direction of the can and hence, wrinkles are likely to occur.

According to an aspect of the present invention, there is provided a battery which includes: a battery can which includes a cylindrical portion having an opening edge portion at one end portion, and a bottom portion closing the other end portion of the cylindrical portion; an electrode assembly which is housed in the cylindrical portion; and an opening sealing body which seals an opening formed in the opening edge portion, wherein the opening sealing body includes a terminal portion and a gasket interposed between the terminal portion and the opening edge portion in a compressed state, the electrode assembly includes a first electrode and a second electrode, the first electrode is electrically connected to the terminal portion, the second electrode is electrically connected to the battery can, the opening edge portion includes at least a base portion extending in an axial direction of the cylindrical portion and a tongue portion protruding from the base portion, and the tongue portion extends inward in a radial direction of the cylindrical portion so as to cover an upper surface of the gasket.

According to the present invention, at the opening edge portion of the battery can, an extending portion which covers the upper surface of the gasket is easily formed in a plane.

DESCRIPTION OF EMBODIMENTS

A battery according to the present exemplary embodiment includes: a battery can which includes a cylindrical portion having an opening edge portion at one end portion, and a bottom portion closing the other end portion of the cylindrical portion; an electrode assembly which is housed in the cylindrical portion; and an opening sealing body which seals an opening formed in the opening edge portion. The opening sealing body includes a terminal portion (an opening sealing plate) and a gasket interposed between the terminal portion and the opening edge portion in a compressed state. The opening edge portion includes at least a base portion extending in an axial direction of the cylindrical portion and a tongue portion protruding from the base portion. The tongue portion extends inward in a radial direction of the cylindrical portion so as to cover an upper surface of the gasket.

In the above-mentioned configuration, a direction in which both end portions of the cylindrical portion face each other is defined as an axial direction. For convenience sake, a direction extending from the opening edge portion toward the bottom portion is defined as a downward direction, and a direction extending from the bottom portion toward the opening edge portion is defined as an upward direction. That is, the vertical direction of the battery is defined based on the axial direction of the cylindrical portion when the battery can is made to stand upright such that the bottom portion faces downward. A direction perpendicular to the axial direction may be referred to as a lateral direction or a radial direction.

In the battery of the present exemplary embodiment, by forming the end portion of the opening edge portion in an uneven shape or in a concavo-convex shape as viewed from the circumferential direction of the opening, the occurrence of wrinkles on the extending portion which covers the upper surface of the gasket is reduced. The convex at the end portion of the opening edge portion forms the tongue portion.

In the above-mentioned configuration, a region excluding the tongue portion of the opening edge portion is defined as the base portion. The tongue portion extends at least along the upper surface of the gasket from the base portion at a portion in the circumferential direction. Notched portions exist at both ends of the tongue portion in the circumferential direction on the upper surface of the gasket. By forming the notched portions, in forming the crimped portions by bending the opening edge portion of the battery can inward in the radial direction, the tongue portion can expand toward the notched portion particularly on the inner peripheral edge where a difference between an outer circumferential length and an inner circumferential length becomes large with respect to the bent portion of the tongue portion. With such a configuration, wrinkles minimally occur in the tongue portion.

The tongue portion may be formed at at least one place, or may be formed at a plurality of places. As a method of forming the tongue portion on the battery can, for example, in forming the cylindrical portion of the battery can, after a flange is formed at the opening edge portion, portions of the flange may be cut off in the circumferential direction and, then, a remaining portion of the flange may be reshaped to form the cylindrical portion having a cutout. In removing a portion of the flange, the tongue portion and the base portion can be formed.

The terminal portion (opening sealing plate) is electrically connected to one electrode (first electrode) of the electrode assembly, and the battery can is electrically connected to the other electrode (second electrode) of the electrode assembly. The terminal portion functions as an external terminal of the first electrode (for example, a positive electrode), and the battery can functions as an external terminal of the second electrode (for example, a negative electrode). In this case, when the difference between the outer circumferential length and the inner circumferential length of the crimped portion increases, wrinkles are likely to occur in the crimped portion. Therefore, even if the extending distance of the crimped portion in the radial direction is increased, it is difficult to increase an area of the crimped portion connectable to the external lead wire. Therefore, it is difficult to pull out the other electrode from the upper side (terminal portion side) of the battery. Accordingly, usually, when external lead wires are connected to the respective external terminals, one external lead wire is led out from an upper surface of the battery, and the other external lead wire is led out from a lower surface of the battery. In this case, a space for wiring is required in the vertical direction of the battery.

On the other hand, according to the battery of the present exemplary embodiment, the tongue portion which is formed flatter can function as the external terminal of the second electrode connected to the battery can. Therefore, both electrodes can be collected from the upper side (opening sealing plate side) of the battery. Therefore, it is sufficient that a space (wiring space) for wiring leads connected to the respective external terminals exists only on the terminal portion side. Accordingly a space for wiring leads can be saved.

As a method of bending the tongue portion along the upper surface of the gasket at the opening edge portion, the following method can be named. For example, in the opening edge portion, a mold for bending is made to approach the tongue portion extending in the axial direction which is not yet bent from the top toward the bottom of the battery, and the tongue portion and the mold are brought into contact with each other. At this stage of the operation, in the mold, by forming a cavity having a curved surface on an inner surface of a portion of the mold to be brought into contact with the tongue portion, the tongue portion which is brought into contact with the cavity is bent along the curved surface while sliding on the curved surface of the cavity.

As a first aspect, the tongue portion may have a portion extending in the axial direction of the cylindrical portion, and a portion bent or curved inward in the radial direction of the cylindrical portion from the portion extending in the axial direction. In this case, the base portion may be continuous with the tongue portion without being bent inward in the radial direction, and the base portion may not extend along the upper surface of the gasket. In this case, a protrusion extending in an outer circumferential direction may be formed on the peripheral edge portion of the gasket so as to cover the end portion of the base portion in the region where the tongue portion is not formed. The protrusion may be used for positioning at the time of mounting the gasket on the opening edge portion. In attaching the terminal portion on the gasket having such a protrusion, the gasket may be fixed to the terminal portion by, for example, insert molding. Alternatively, the gasket may be formed so as to cover the upper surface and the side peripheral surface of the terminal portion.

As a second aspect, the base portion may be bent or curved inward in the radial direction of the cylindrical portion and cover the upper surface of the gasket over the entire circumference of the opening. In this case, the tongue portion extends in further the inner circumferential direction on the upper surface of the gasket from the base portion extending along the upper surface of the gasket. Therefore, the extending distance of the opening edge portion in the radial direction in the region where the tongue portion is formed is larger than the extending distance of the opening edge portion (that is, the base portion) in the radial direction in the region where the tongue portion is not formed. With such a configuration, it is possible to suppress displacement of the gasket when a pressure in the battery can is increased.

In the case of the second aspect, the cylindrical portion may have an annular groove reduced in diameter toward the inner peripheral side closer to the bottom portion with respect to the opening edge portion. By interposing the gasket between the opening edge portion and the annular groove, sealing is provided between the opening edge portion and the terminal portion. In such a configuration, the gasket can be compressed in the axial direction of the cylindrical portion.

However, the annular groove may be provided also in the first aspect. In this case, the gasket can be compressed in the axial direction of the cylindrical portion at a portion in the circumferential direction in which the tongue portion is formed. An annular groove may be formed so as to position the gasket at the opening edge portion. In forming the annular groove in the first aspect, the gasket may be compressed in the axial direction of the cylindrical portion or may not be compressed in the axial direction of the cylindrical portion. In the latter case, the gasket may be compressed in the radial direction of the cylindrical portion.

The gasket may be compressed in the radial direction of the cylindrical portion. By crimping the opening edge portion in the radial direction (lateral direction) perpendicular to the axis, the gasket may be compressed in the radial direction. In the case of the first aspect where the annular groove is not formed, sealing can be provided between the opening edge portion and the terminal portion as the gasket is compressed in the radial direction. Also in the second aspect, the gasket may be compressed in the radial direction of the cylindrical portion.

The recessed portion may be formed on the upper surface of the gasket. In this case, the tongue portion can be housed in the recessed portion. The recessed portion has a role of suppressing a change in size of the battery in the axial direction caused by the tongue portion. With such a configuration, the size of the battery in the axial direction can be defined by the height of the gasket in the region where the recessed portion is not formed. The recessed portion facilitates positioning of the tongue portion on the upper surface of the gasket.

A depth of the recessed portion may be larger than a thickness of the tongue portion. In this case, a step is formed between the portion of the gasket where the recessed portion is not formed and the tongue portion housed in the recessed portion. Therefore, a water droplet or the like adhering to the upper surface of the tongue portion housed in the recessed portion is prevented from extending to the terminal portion beyond the portion of the gasket where the recessed portion is not formed. As a result, short circuiting is suppressed in the battery and hence, reliability of the battery is enhanced.

A gap may be formed between the recessed portion and the tongue portion. In this case, even when a water droplet or the like adhering to the upper surface of the tongue portion intends to extend to the terminal portion beyond the region of the gasket where the recessed portion is not formed, the water droplet or the like is easily caught by the gap (groove) interposed between the tongue portion and the portion of the gasket where the recessed portion is not formed. Therefore, the water droplet is prevented from extending to the terminal portion. As a result, short circuiting is suppressed in the battery and hence, reliability of the battery is enhanced. From a viewpoint of suppressing short circuiting between the tongue portion and the terminal portion caused by adhesion of water droplets or the like, it is preferable that the gap between the recessed portion and the tongue portion be interposed in the radial direction of the cylindrical portion.

Hereinafter, a battery according to an exemplary embodiment of the present invention will be specifically described with reference to the drawings. However, the present invention is not limited to such a battery.

First Exemplary Embodiment

Figure 1:
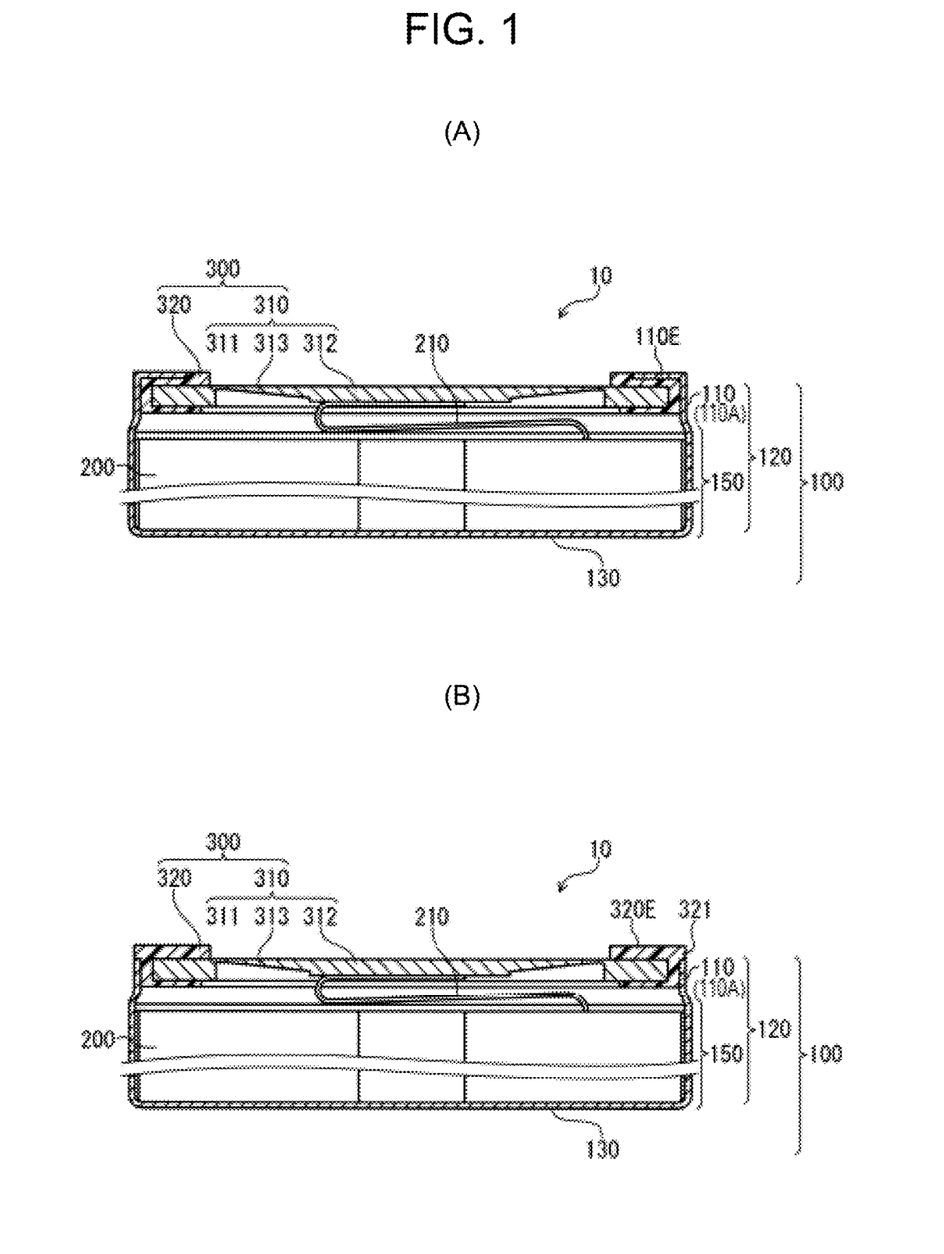
FIG. 1: a first schematic longitudinal cross-sectional view (A) of a battery according to a first exemplary embodiment of the present invention, and a second schematic longitudinal cross-sectional view (B) of the battery according to the first exemplary embodiment of the present invention.
Figure 2:
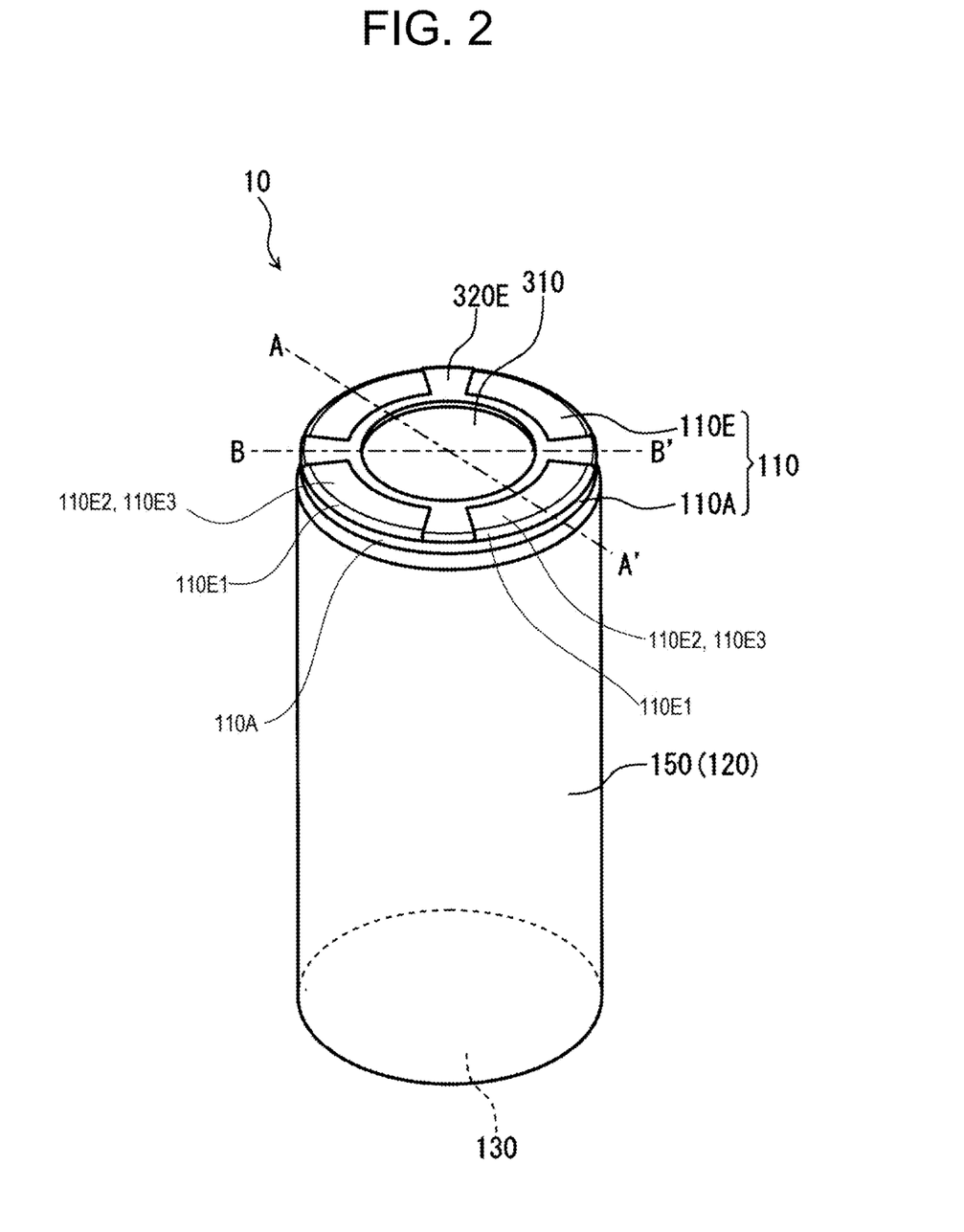
FIG. 2 is a perspective view showing an external appearance of the battery.

FIG. 1 is a schematic longitudinal cross-sectional view of battery 10 according to the present exemplary embodiment. FIG. 2 is a perspective view of the battery. FIG. 1(A) is a cross-sectional view of battery 10 in a plane which includes line A-A' in FIG. 2 and is parallel to an axis of the battery. FIG. 1(B) is a cross-sectional view of battery 10 in a plane which incudes line B-B' in FIG. 2 and is parallel to the axis of the battery. In FIG. 1, a state of the cylindrical portion of the battery, particularly, a state of the cylindrical portion of the battery in the vicinity of opening edge portion 110 is described in an emphasized manner. In this exemplary embodiment, there may be cases where a size ratio between respective elements of constituent members such as terminal portion 310 and gasket 320 does not agree with an actual size ratio. The same applies to drawings used hereinafter.

Battery 10 has a cylindrical shape. battery 10 includes: bottomed battery can 100 having a cylindrical shape; electrode assembly 200 having a cylindrical shape and housed in the battery can; and opening sealing body 300 which seals an opening of battery can 100. Battery can 100 includes: cylindrical portion 120 which houses electrode assembly 200; and bottom portion 130. Opening edge portion 110 of cylindrical portion 120 is formed on one end portion of cylindrical portion 120, and the other end portion of cylindrical portion 120 is closed by bottom portion 130. Cylindrical portion 120 includes: opening edge portion 110; and housing portion 150 which houses the electrode assembly. The opening of opening edge portion 110 is closed by opening sealing body 300.

Opening sealing body 300 includes, for example, terminal portion (an opening sealing plate) 310, and gasket 320.

Terminal portion 310 has, for example, a disk shape and has an explosion-proof function. Specifically, terminal portion 310 includes: peripheral edge portion 311 and central region 312 both having a large wall thickness for securing a structural strength; and thin wall thickness portion 313 which has an explosion-proof function. Thin wall thickness portion 313 is formed in a region disposed between peripheral edge portion 311 and central region 312. End portion of lead wire 210 led out from a positive electrode or a negative electrode which forms electrode assembly 200 is connected to an inner side surface of central region 312. Therefore, terminal portion 310 has a terminal function on one side. In the example shown in FIG. 1, an outer surface of peripheral edge portion 311, an outer surface of central region 312, and an outer surface of thin wall thickness portion 313 are substantially coplanar.

In the example shown in FIG. 1, thin wall thickness portion 313 is formed so as to be thinner from central region 312 toward peripheral edge portion 311, and thin wall thickness portion 313 becomes thinnest at a boundary position between thin wall thickness portion 313 and peripheral edge portion 311. Therefore, when an internal pressure in battery can 100 is increased, opening sealing plate 310 swells outward and hence, a stress generated by tension concentrates on a boundary portion between peripheral edge portion 311, and thin wall thickness portion 313 and a breakage occurs from the boundary portion. As a result, the internal pressure in battery can 100 is released, and safety of battery 10 is secured. In acquiring advantageous effects of the present invention, an explosion-proof function is not essential.

Gasket 320 provides sealing between opening edge portion 110 and terminal portion 310. Gasket 320 includes, for example, an outer ring portion which covers an upper side of peripheral edge portion 311 of terminal portion 310, an inner ring portion which covers a lower side of peripheral edge portion 311 of terminal portion 310, and a connecting ring portion which connects the outer ring portion and the inner ring portion to each other. For example, the outer ring portion, the inner ring portion, and the connecting ring portion form an integral body formed by molding.

In FIG. 1, opening edge portion 110 is crimped in the radial direction (lateral direction) so that gasket 320 is compressed in the radial direction. As a result, sealing is provided between opening edge portion 110 and terminal portion 310 by a repulsive force of gasket 320.

As shown in FIG. 2, a plurality of (four in this exemplary embodiment) tongue portions 110E which protrude from base portion 110A are formed on opening edge portion 110. As shown in FIGS. 1(A) and 2, each tongue portion 110E has: a first portion 110E1 extending in the axial direction of cylindrical portion 120; and a second portion 110E2 bent inward in the radial direction from the portion 110E1 extending in the axial direction. Tongue portion 110E has a third portion 110E3 that extends so as to cover an upper side of gasket 320. On other hand, at portions of the end portion of opening edge portion 110 in the circumferential direction, each end portion between tongue portions 110E is, as shown in FIGS. 1(B) and 2, not bent inward in the radial direction and does not extend over gasket 320. An outer surface 320E of gasket 320 is exposed to the outside between tongue portions 110E. As shown in FIG. 1(B), the end portion of opening edge portion (base portion) 110 in regions where tongue portions 110E are not formed are closed by protrusions 321.

Figure 3:
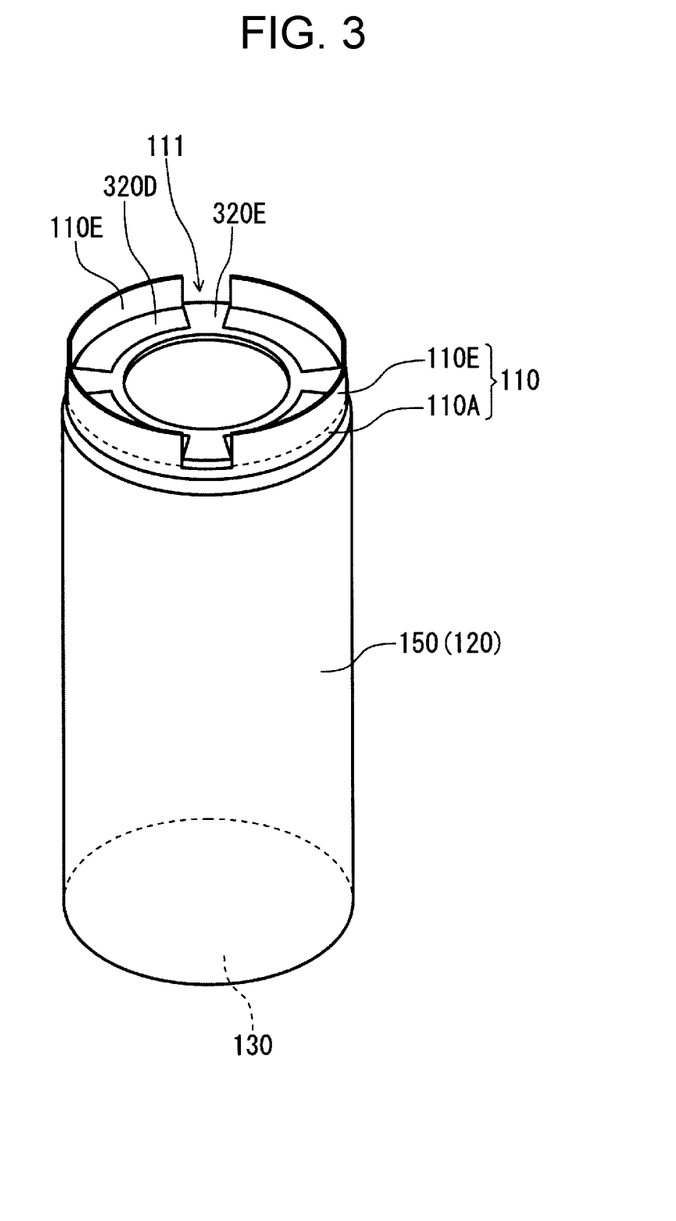
FIG. 3 is a perspective view showing an external appearance of the battery before an opening edge portion is bent inward in a radial direction.

FIG. 3 shows a state of battery 10 before opening edge portion 110 of cylindrical portion 120 is bent inward in a radial direction. Opening edge portion 110 has a base portion 110A, and tongue portions 110E which protrude from base portion 110A. In some regions of opening edge portion 110 in the circumferential direction where tongue portions 110E are not formed, the end portion of base portion 110A is exposed. A notch portion 111 is interposed between tongue portions 110E disposed adjacently to each other.

As shown in FIG. 3, a recessed portion 320D is formed on an upper surface of the gasket. With such a configuration, when tongue portions 110E are bent inward in the radial direction, portions of tongue portion 110E which are bent and extend inward in the radial direction are housed in recessed portion 320D.

Figure 4:
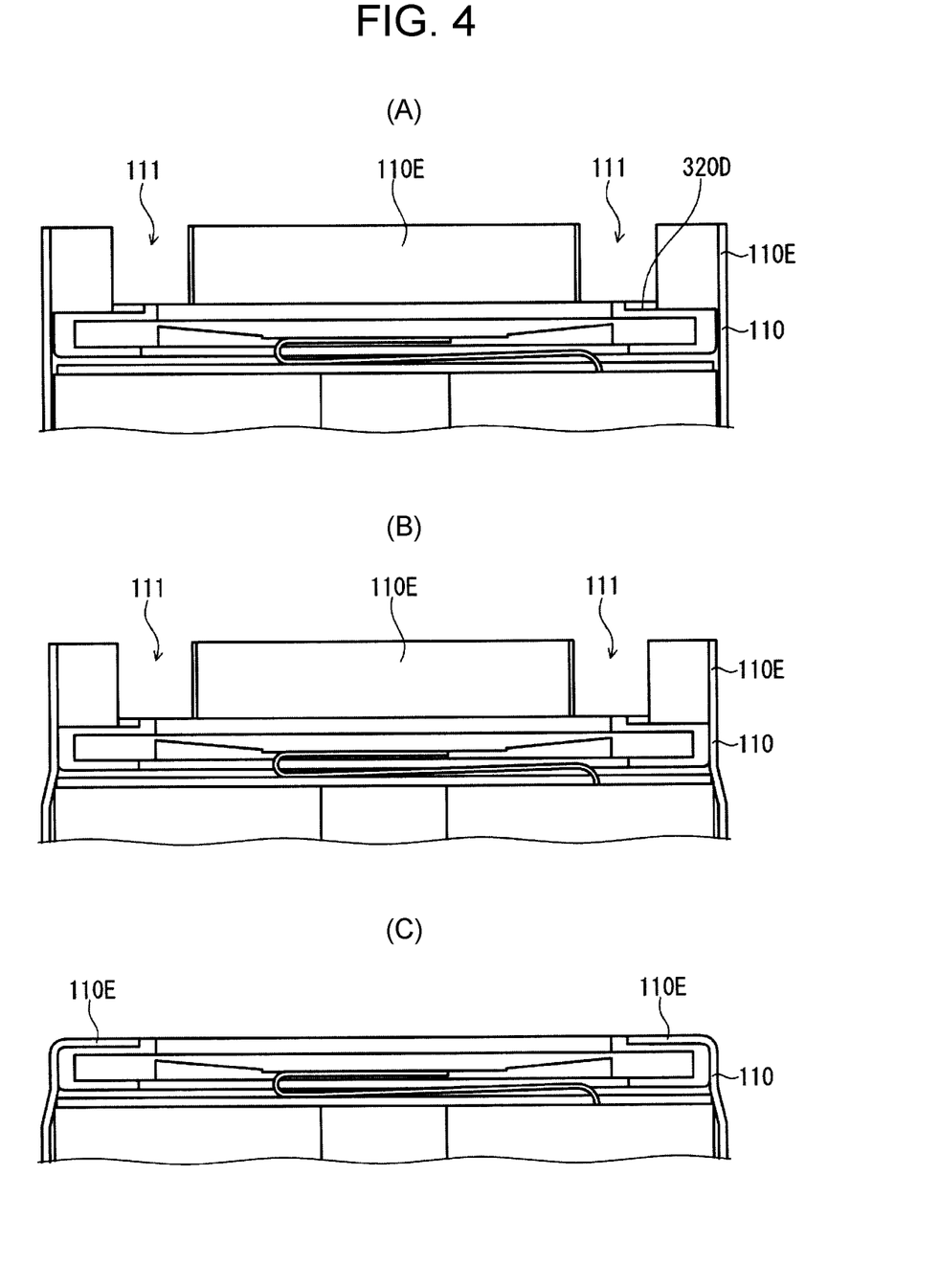
FIG. 4 is a series of cross-sectional step views showing steps of manufacturing the battery.

FIG. 4 shows a method for manufacturing battery 10. FIG. 4(A to C) are a series of cross-sectional step views of battery 10 in a plane which includes line A-A' in FIG. 2 and is parallel to an axis of the battery.

First, as shown in FIG. 4(A), opening sealing body 300 where gasket 320 is attached to terminal portion 310 is mounted on opening edge portion 110 such that the positions of protrusions 321 of gasket 320 are aligned with the positions of notch portions 111.

Next, as shown in FIG. 4(B), opening edge portion 110 is crimped in the radial direction. Gasket 320 is compressed in the radial direction by a force generated by crimping, and the outer diameter of opening edge portion 110 is reduced with respect to housing portion 150.

Thereafter, as shown in FIG. 4(C), portions of tongue portions 110E are bent inward to provide battery 10.

A material of battery can 100 is not particularly limited. Iron, an iron alloy (including stainless steel), copper, aluminum, and an aluminum alloy (an alloy containing trace amounts of other metals such as manganese, copper and the like) can be exemplified. A material of terminal portion 310 is also not particularly limited, and the same materials used for forming battery can 100 can be exemplified.

A material of gasket 320 is not limited. For example, polypropylene (PP), polyphenylene sulfide (PPS), polyethylene (PE), polybutylene terephthalate (PBT), perfluoroalkoxyalkane (PFA), polytetrafluoroethylene (PTFE), polyamide (PA), or the like can be used as a material for easily forming gasket 320 by integral molding.

Second Exemplary Embodiment

Figure 5:
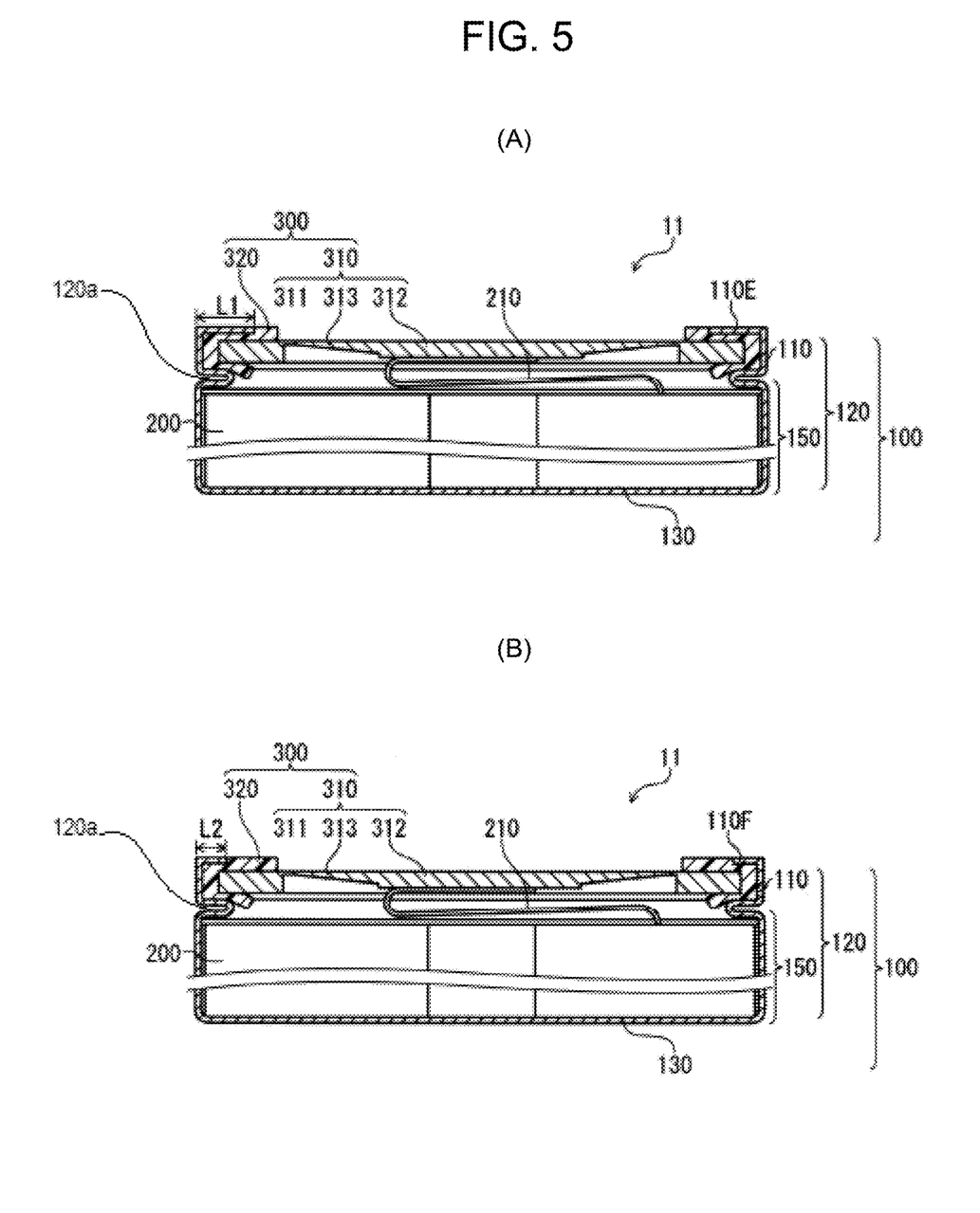
FIG. 5: a first schematic longitudinal cross-sectional view (A) of a battery according to a second exemplary embodiment of the present invention, and a second schematic longitudinal cross-sectional view (B) of the battery according to the second exemplary embodiment of the present invention.
Figure 6:
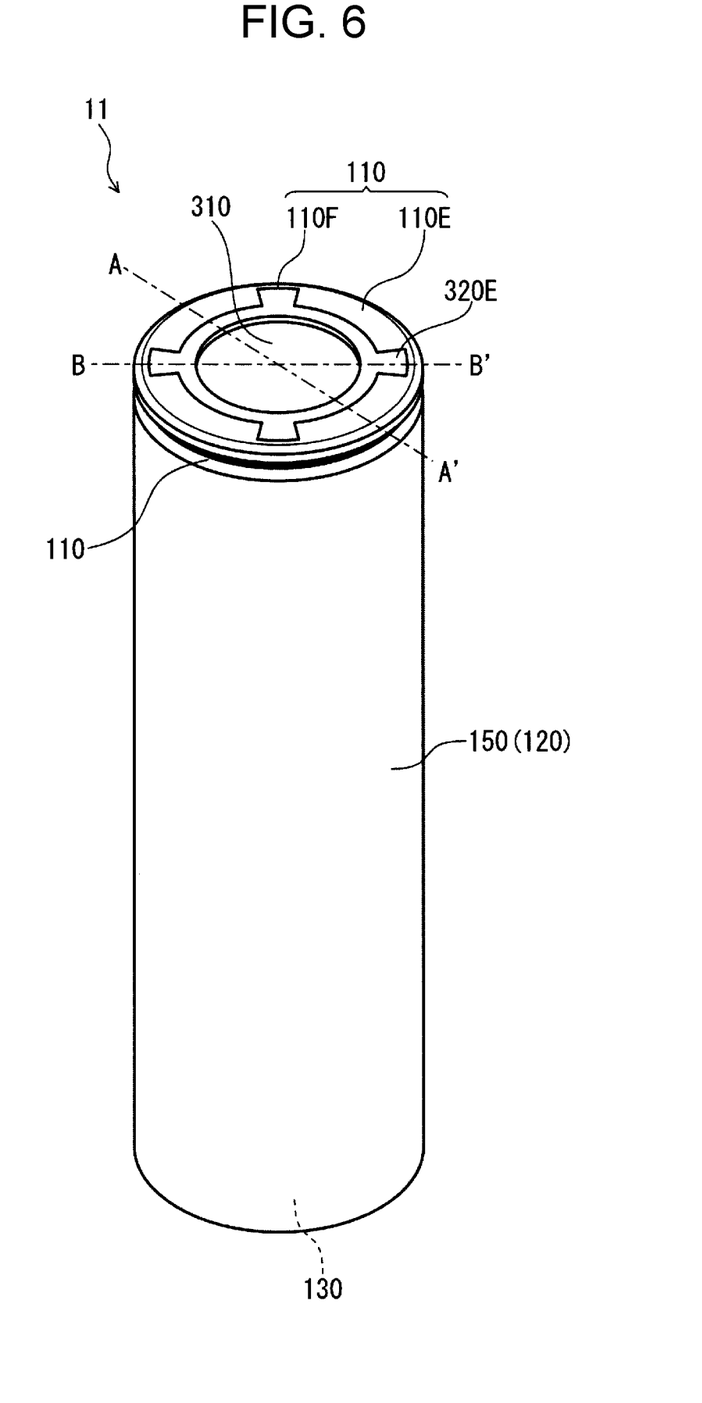
FIG. 6 is a perspective view showing an external appearance of the battery.

FIG. 5 is a schematic longitudinal cross-sectional view of battery 11 according to this exemplary embodiment. FIG. 6 is a perspective view of the battery. FIG. 5(A) is a cross-sectional view of battery 11 in a plane which includes line A-A' in FIG. 6 and is parallel to an axis of the battery. FIG. 5(B) is a cross-sectional view of battery 11 in a plane which includes line B-B' in FIG. 6 and is parallel to the axis of the battery.

In the example shown in FIG. 5, an annular groove 120a is formed on cylindrical portion 120. Opening edge portion 110 is bent and crimped inward in the radial direction over the entire circumference, and covers an upper surface of a gasket. With such a configuration, gasket 320 is compressed in the axial direction. However, lengths of portions of opening edge portion 110 extending on the upper surface of the gasket in the radial direction differ depending on positions in the circumferential direction. Tongue portions 110E are formed at portions of opening edge portion 110 having a large extending length.

As shown in FIG. 5(A), tongue portions 110E extend inward so as to cover the upper surface of gasket 320. Similarly, also in the regions where tongue portions 110E are not formed, as shown in FIG. 5(B), base portions 110F which are portions of opening edge portion 110 extend inward so as to cover the upper surface of gasket 320. However, an extending distance (L1 in FIG. 5(A)) of opening edge portion 110 (including base portion 110F and tongue portion 110E) in a radial direction in the region where tongue portion 110E is formed is larger than an extending distance (L2 in FIG. 5(B)) of opening edge portion 110 (base portion 110F) in the radial direction in the region where tongue portion 110E is not formed.

Other configurations of battery 11 are substantially similar to the corresponding configurations of battery 10 and hence, the detailed description of other configurations is omitted.

Next, a configuration of electrode assembly 200 will be exemplified using a lithium ion secondary battery as an example.

Cylindrical electrode assembly 200 is a winding type. Cylindrical electrode assembly 200 is formed by spirally winding a positive electrode and a negative electrode with a separator interposed therebetween. Internal lead wire 210 is connected to one of the positive electrode and the negative electrode. Internal lead wire 210 is connected to an inner side surface of central region 312 of terminal portion 310 by welding or the like. The other lead wire is connected to the other of the positive electrode and the negative electrode, and the other lead wire is connected to an inner surface of battery can 100 by welding or the like. Another insulating plate (a lower insulating plate) may be disposed between bottom portion 130 of battery can 100 and electrode assembly 200. In this case, the other lead may extend so as to route around the other insulating plate or extend so as to be inserted into a through hole formed in the other insulating plate.

(Negative Electrode)

The negative electrode includes a strip-shaped negative electrode current collector, and negative electrode active material layers formed on both surfaces of the negative electrode current collector. As the negative electrode current collector, a metal film, a metal foil, or the like is used. A material of the negative electrode current collector is preferably at least one selected from a group consisting of copper, nickel, titanium, alloys of these metals, and stainless steel. A thickness of the negative electrode current collector is preferably, for example, 5 μm to 30 μm.

The negative electrode active material layer contains a negative electrode active material, and further contains a binder and an electrically conductive agent when necessary.

The negative electrode active material layer may be a deposited film formed by a gas phase method (for example, vapor deposition). As the negative electrode active material, Li metal, metal or an alloy which electrochemically reacts with Li, a carbon material (for example, graphite), a silicon alloy, a silicon oxide, and a metal oxide (for example, lithium titanate) are named. A thickness of the negative electrode active material layer is preferably, for example, 1 μm to 300 μm.

(Positive Electrode)

The positive electrode includes a strip-shaped positive electrode current collector, and positive electrode active material layers formed on both surfaces of the positive electrode current collector. As the positive electrode current collector, a metal film, a metal foil (a stainless steel foil, an aluminum foil or an aluminum alloy foil) or the like is used.

The positive electrode active material layer contains a positive electrode active material and a binder, and further contains an electrically conductive agent when necessary. The positive electrode active material is not particularly limited, but a lithium-containing composite oxide such as $LiCoO_2$ or $LiNiO_2$ can be used. A thickness of the positive electrode active material layer is preferably, for example, 1 μm to 300 μm.

As the electrically conductive agent to be contained in each active material layer, graphite, carbon black, or the like is used. An amount of the electrically conductive agent is, for example, 0 parts by mass to 20 parts by mass per 100 parts by mass of the active material. As a binder to be contained in the active material layer, a fluororesin, an acrylic resin, rubber particles, or the like is used. An amount of the binder is, for example, 0.5 parts by mass to 15 parts by mass per 100 parts by mass of the active material.

(Separator)

As the separator, a resin microporous membrane or a resin nonwoven fabric is preferably used. A material (resin) of the separator is preferably polyolefin, polyamide, polyamideimide, or the like. A thickness of the separator is, for example, 8 μm to 30 μm.

(Electrolyte)

As the electrolyte, a nonaqueous solvent in which a lithium salt is dissolved can be used. As the lithium salt, $LiClO_4$, $LiBF_4$, $LiPF_6$, $LiCF_3SO_3$, $LiCF_3CO_2$, and imide salts are named. As the nonaqueous solvent include cyclic carbonate esters such as propylene carbonate, ethylene carbonate, and butylene carbonate; chain carbonate esters such as diethyl carbonate, ethyl methyl carbonate, and dimethyl carbonate; and cyclic carboxylate esters such as γ-butyrolactone and γ-valerolactone are named.

The description has been made by exemplifying the lithium ion secondary battery. However, the present invention can be used in a battery in which an opening of a battery can is sealed using an opening sealing body regardless of whether the battery is a primary battery or a secondary battery.

INDUSTRIAL APPLICABILITY

The battery according to the present invention can be used for batteries of various can types, and is suitable for use as a power source for mobile devices, hybrid vehicles, electric vehicles, and the like.

REFERENCE MARKS IN THE DRAWINGS

100: battery can
120: cylindrical portion
110: opening edge portion
110A,110F: base portion
110E: tongue portion
111: notch portion
150: housing portion
130: bottom portion
200: electrode assembly
210: internal lead wire
300: opening sealing body
310: terminal portion
311: peripheral edge portion
312: central region
313: thin wall thickness portion
320: gasket
320D: recessed portion
320E: outer surface
321: protrusion

The invention claimed is:

1. A battery comprising:
   a battery can which includes
      a cylindrical portion having an opening edge portion at one end portion of the cylindrical portion, and
      a bottom portion closing the other end portion of the cylindrical portion;
   an electrode assembly which is housed in the cylindrical portion; and
   an opening sealing body which seals an opening in the opening edge portion, wherein
   the opening sealing body includes
      a terminal portion and
      a gasket interposed between the terminal portion and the opening edge portion in
   a compressed state,
   the electrode assembly includes a first electrode and a second electrode,
   the first electrode is electrically connected to the terminal portion,
   the second electrode is electrically connected to the battery can,
   the opening edge portion includes at least
      a base portion provided in an annular shape and extending in an axial direction of the cylindrical portion and
      a tongue portion protruding from the base portion and arranged along a circumferential direction of the cylindrical portion without encompassing an entire circumference of the opening edge portion, and
   the tongue portion extends inward of the cylindrical portion in a radial direction of the cylindrical portion and covers an upper surface of the gasket,
   wherein the tongue portion includes:
      a first portion extending in the axial direction of the cylindrical portion,
      a second portion bent or curved inward from the first portion in the radial direction of the cylindrical portion, and
      a third portion extending from the second portion to cover the upper surface of the gasket,
   the first portion, the second portion, and the third portion of the tongue portion are arranged along the circumferential direction of the cylindrical portion without encompassing the entire circumference of the opening edge portion.

2. The battery according to claim 1, wherein the gasket includes a protrusion extending in an outer circumferential direction on a peripheral edge portion of the gasket, and
   the protrusion covers an end portion of the base portion wherein the tongue portion is offset from the end portion of the base portion in the circumferential direction of the cylindrical portion.

3. The battery according to claim 1, wherein the base portion is bent or curved inward of the cylindrical portion in the radial direction of the cylindrical portion and covers an upper surface of the gasket, and an extending distance in a radial direction of the opening edge portion in a region with the tongue portion is larger than an extending distance in the radial direction of the opening edge portion in a region without the tongue portion.

4. The battery according to claim 1, wherein the cylindrical portion has an annular groove whose diameter is reduced toward an inner peripheral side closer to the bottom portion with respect to the opening edge portion, and the gasket is interposed between the opening edge portion and the annular groove.

5. The battery according to claim 4, wherein the gasket is compressed in the axial direction of the cylindrical portion.

6. The battery according to claim 1, wherein the gasket is compressed in the radial direction of the cylindrical portion.

7. The battery according to claim 1, wherein the gasket includes a recessed portion on an upper surface of the gasket, and the tongue portion is housed in the recessed portion.

8. The battery according to claim 7, wherein a depth of the recessed portion is larger than a thickness of the tongue portion.

9. The battery according to claim 7, wherein the battery includes a gap between the recessed portion and the tongue portion.

10. A battery comprising:
a battery can which includes
a cylindrical portion having an opening edge portion at one end portion of the cylindrical portion, and
a bottom portion closing the other end portion of the cylindrical portion;
an electrode assembly which is housed in the cylindrical portion; and
an opening sealing body which seals an opening in the opening edge portion, wherein
the opening sealing body includes
a terminal portion and
a gasket interposed between the terminal portion and the opening edge portion in a compressed state,
the electrode assembly includes a first electrode and a second electrode,
the first electrode is electrically connected to the terminal portion,
the second electrode is electrically connected to the battery can,
the opening edge portion includes at least
a base portion provided in an annular shape and extending in an axial direction of the cylindrical portion and
a tongue portion protruding from the base portion and arranged along a circumferential direction of the cylindrical portion without encompassing an entire circumference of the opening edge portion, and
the tongue portion extends inward of the cylindrical portion in a radial direction of the cylindrical portion and covers an upper surface of the gasket,
wherein the gasket includes a recessed portion on an upper surface of the gasket, and the tongue portion is housed in the recessed portion,
the recessed portion is arranged along the circumferential direction of the cylindrical portion without encompassing an entire circumference of the gasket.

* * * * *